US005162639A

United States Patent [19]

Sugiyama

[11] Patent Number: 5,162,639

[45] Date of Patent: Nov. 10, 1992

[54] METHOD FOR UPDATING PRICE LOOK UP FILES IN A POINT OF SALE TERMINAL

[75] Inventor: Hiromasa Sugiyama, Oiso, Japan

[73] Assignee: NCR Corporation, Dayton, Ohio

[21] Appl. No.: 841,237

[22] Filed: Feb. 24, 1992

Related U.S. Application Data

[63] Continuation of Ser. No. 528,642, May 25, 1990, abandoned.

[30] Foreign Application Priority Data

Jun. 30, 1989 [JP] Japan .................................... 1-16711

[51] Int. Cl.[5] ............................................ G06K 15/00

[52] U.S. Cl. .................................... 235/383; 235/375; 235/385

[58] Field of Search ............... 235/375, 383, 385, 405; 364/525

*Primary Examiner*—Harold Pitts

*Attorney, Agent, or Firm*—Matthew R. Jenkins

[57] ABSTRACT

A method for updating a PLU file in a POS terminal. A slip having a dedicated format for printing data corresponding to a not-yet-registered article is prepared in advance of a retail transaction. When the not-yet-registered article is encountered during the retail transaction, a message is displayed on a display of the POS terminal to inform the operator that the particular article is not registered in the PLU file. The operator then inserts the dedicated slip into a print slot of a printer on the POS terminal in order to print article data (such as a message that the article is not-yet-registered, a code number for the article, a date and time for the transaction, and the like) thereon. The dedicated slip is handed over to the manager of the store who then updates the PLU file to include information (such as unit price and article name) for the not-yet-registered article.

10 Claims, 2 Drawing Sheets

METHOD FOR UPDATING PRICE LOOK UP FILES IN A POINT OF SALE TERMINAL

This is a continuation of co-pending application Ser. No. 528,642 filed on May 25, 1990 now abandoned.

BACKGROUND OF THE INVENTION

1. Field of the Invention

This invention relates to a retail checkout system, and more particularly, to a method of updating price look up (PLU) files in a point of sale terminal of a retail establishment.

2. Description of Related Art

The use of Universal Product Code (UPC) labels or bar codes to identify purchased articles or merchandise items in a checkout system of a retail establishment has become quite common. The typical checkout system includes a point of sale (POS) terminal having an optical scanner for scanning the bar codes on the purchased articles or items. The scanner is usually located in a checkout counter, but it may be hand-held by an operator of the terminal. In either case, when a customer purchases articles, he brings them to the checkout counter. The operator at the checkout counter then uses the optical scanner to scan the bar code affixed to the articles. The optical scanner generates electrical data signals corresponding to the bar code on the label. The data signals are typically used by the POS terminal to "look up" or locate a price for the article in a price look up (PLU) table or file stored in the POS terminal or stored in a remote in-store processor which is coupled to the POS terminal. The price located for the article is then transmitted to the POS terminal where it can be printed on a receipt or like document and/or displayed on a display coupled to the POS terminal.

In checkout systems which utilize bar codes, it is necessary to register information (such as the article name, unit price, and/or class code) for each article in the inventory of the retail establishment. It is not uncommon that the information corresponding to some articles will not be registered in the PLU file at the time the article is purchased because the article is a new arrival, because of a large volume of articles in the inventory of the retail establishment, or because the article was mis-registered in the PLU file due to human error. When information corresponding to the article is not-yet-registered or is mis-registered in the PLU file (hereinafter collectively referred to as "not-yet-registered"), the not-yet-registered information has typically been corrected or saved by any one of the following methods. First, an operator of the POS terminal can register the information for that article on the spot using the POS terminal (for the immediate transaction only), and he can then add the article information to the PLU file later. Secondly, if information is not in the PLU file of the POS terminal, but is stored in the PLU file of a connected remote in-store processor, the operator can use the POS terminal to inquire or poll the PLU file in the in-store processor for information corresponding to the article being purchased. If information corresponding to the article is stored in the PLU file in the in-store processor, the information will be transmitted from the processor to the POS terminal, thereby updating the POS terminal. Thirdly, when a not-yet-registered article is encountered, the operator obtains information for the article by manually referring to a printed look-up catalogue. The POS terminal stores the information for articles encountered during the business day on a floppy disk. The floppy disk is then used to update the PLU file at the end of the business day.

The above three methods have the following drawbacks. In the first method, the customer who purchased the article has to wait until the operator registers the article in the POS terminal. This is an obstacle to efficiency. If the operator is inexperienced, there is also a danger of registering an incorrect price for the article. In the second method, the checkout system having the in-store processor is large in scale and the information on the not-yet-registered article is not always stored in the PLU file in the in-store processor. In the third method, the information for the not-yet-registered article which is stored on the floppy disk is not set and registered until the end of that business day.

SUMMARY OF THE INVENTION

In accordance with the present invention, there is provided a method for updating a PLU file for a not-yet-registered article in a POS terminal which is used in a checkout system, said method comprising the steps of: (a) inputting bar code data corresponding to the not-yet-registered article into the POS terminal; (b) printing under the control of the POS terminal data corresponding to the not-yet-registered article on a slip having a dedicated format; and (c) using said information printed on said slip to update said PLU file.

A principal object of the present invention is to provide a method of updating a PLU file for a not-yet-registered article in a checkout system.

Another object is to permit a PLU file to be updated quickly and accurately.

Yet another object of the present invention is to provide a method for updating PLU files for not-yet-registered articles without inconveniencing a customer.

Additional objects and features of the present invention will become apparent from a reading of the following description, drawing, and claims.

DESCRIPTION OF THE PREFERRED EMBODIMENT

Figure 1B:
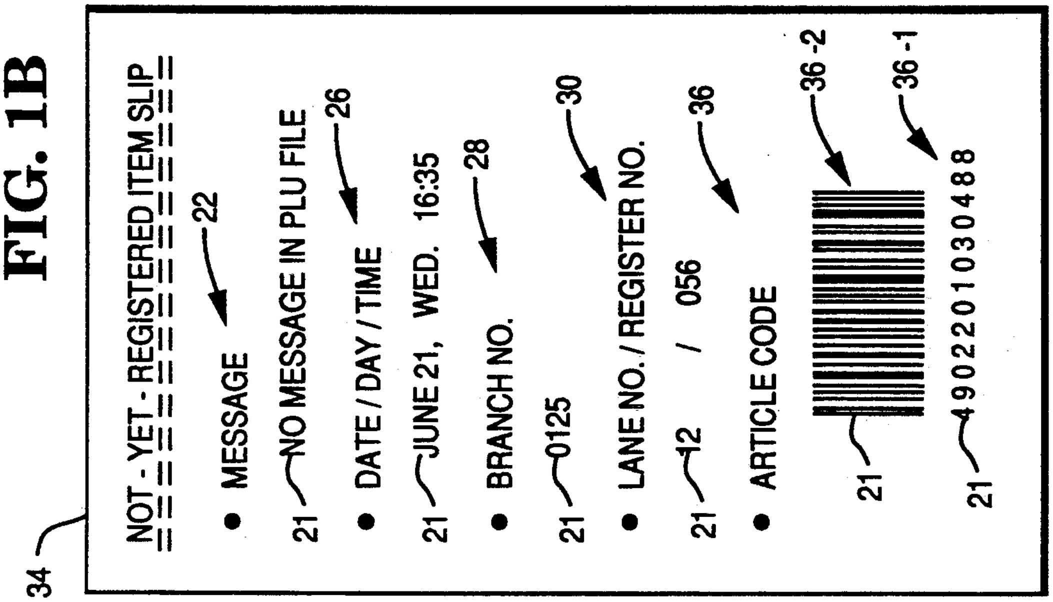
FIGS. 1A and 1B illustrate two slips having separate formats for formatting data corresponding to a not-yet-registered article.
Figure 1A:
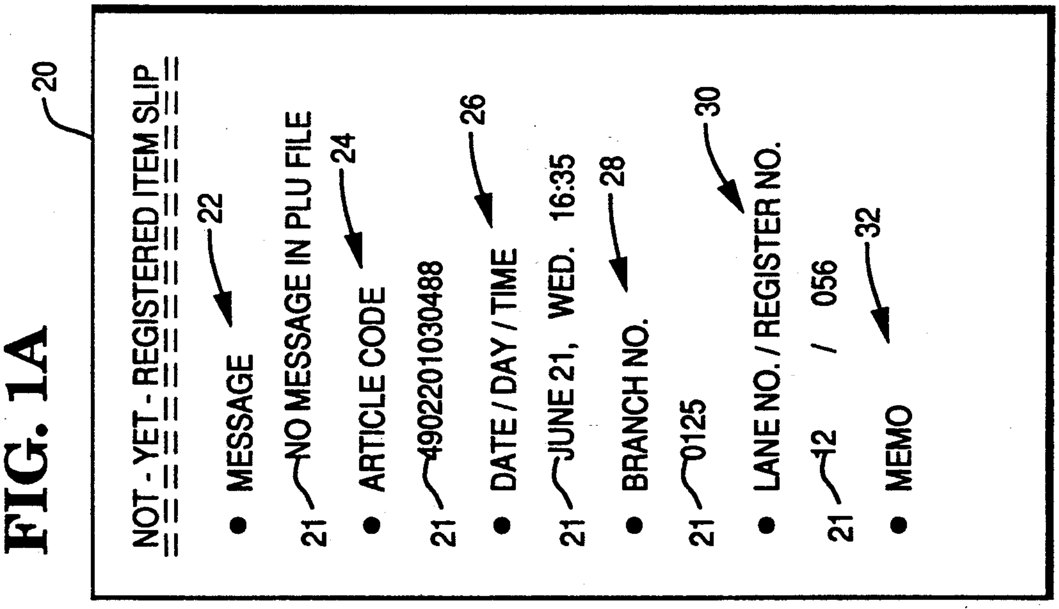

FIGS. 1A and 1B show a slip 20 and a slip 34, respectively, which may be used in a checkout system which includes the preferred embodiment of this invention. The slip 20 has a dedicated print format which is used to organize data 21 corresponding to an article (not shown) being purchased by a customer. The print format on the slip 20 includes an article code 24 which corresponds to a UPC label or bar code (not shown) affixed to the article. The dedicated format of the slip 20 also includes a place for a message 22, a date/day/time 26, a store branch number 28, and a register number 30, as shown in FIG. 1A. This data 21 is indispensable to investigate and confirm the time and place, for example, where the not-yet-registered article was encountered. The slip 20 may also include a place for a memo 32 where a memo or note (not shown) may be printed.

As shown in FIG. 1B, the slip 34 includes the dedicated print format for data 21 that is the same format used for the slip 20, except that there is no memo 32 and the article code 24 on the slip 20 is replaced by an article code 36. The article code 36 includes a numeric article code 36-1 and a bar code 36-2 corresponding to the numeric article code 36-1. The bar code 36-2 facilitates avoiding clerical errors, for example, when the numeric article code 36-1 is inputted into an in-store processor (not shown) by the operator. For example, when the not-yet-registered article is encountered, the operator inserts the slip 20 into a printer (not shown) in the POS terminal (not shown) and the printer prints the data 21 onto the slip 20, as described later herein. The slip 20 is then handed over to a manager of the retail establishment, whereupon the manager updates a PLU file which resides in either the POS terminal or in an in-store processor (not shown) coupled to the POS terminal to include article information (such as article price and name). However, it may be troublesome and inaccurate to input the 13 digits of the article code 24 by using a keyboard coupled to the POS terminal, for example, because of the likelihood that a clerical error in inputting the article code 24 may occur. To avoid this problem, the slip 34 may be used instead of slip 20. The bar code 36-2 on the slip 34 can be read or scanned by an optical scanner (not shown) connected to the POS terminal. This facilitates inputting the numeric article code 36-1 accurately.

Figure 2:
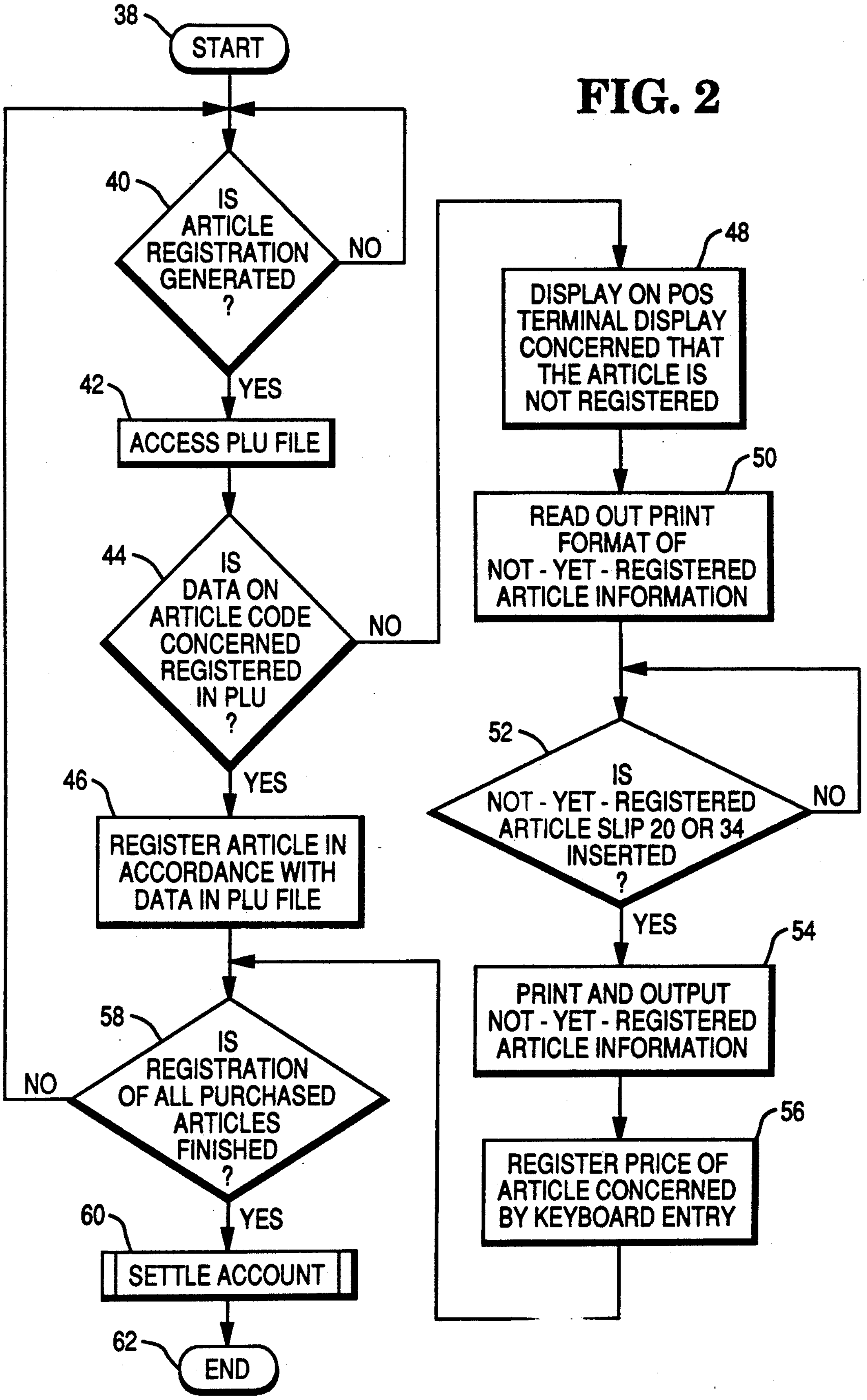
FIG. 2 is a flow chart of a method of this invention.

FIG. 2 is a flow chart of the purchased article registering operation used in a preferred embodiment of this invention. Assume that an operator has started "ringing up" or registering articles (not shown) that a customer has purchased, as represented by block 38 in FIG. 2. Each purchased article has a UPC label or bar code (not shown) affixed thereto, and the bar code is read or scanned by an optical scanner (not shown) which is connected to the POS terminal, as described earlier herein. After the article registering process has begun (block 40), the POS terminal accesses the PLU file (block 42). If the numeric article code 36-1, for example, is registered in the PLU file, a price for the purchased article is accessed from the PLU file and the article is registered as illustrated by blocks 44 and 46.

However, if the numeric article code 36-1 is not registered in the PLU file, an indication or display that the article is not registered in the PLU file is made on the display of the POS terminal (block 48). The print format of the data 21 (FIGS. 1A and 1B) corresponding to the not-yet-registered article, which has been optionally set in advance by the operator, is read out or displayed on the display of the POS terminal (block 50 in FIG. 2). The operator at the POS terminal then inserts the slip 34, for example, into the printer of the POS terminal having the same format as displayed on the POS terminal (block 52 in FIG. 2). After the slip 34 is inserted into the printer of the POS terminal, the data 21 is printed thereon (block 54). The price of the particular article is manually inputted by the operator under the operation of the keyboard (not shown) of the POS terminal (block 56). The operator obtains the price from the price label which is affixed to the article.

The operator registers other articles in the same manner beginning at block 38. After all the articles purchased by the customer have been registered (block 58), the customer settles his account (block 60) and the article buying and selling transaction is complete (block 62).

The slips 34 for the not-yet-registered articles are handed over to the manager of the store at the completion of the transaction or of a plurality of transactions. The manager sequentially updates the PLU files to include information, such as the price, name, class, and the like for the not-yet-registered articles. This permits the manager of the store to investigate the article price, name, class and other data 21 based on the slip 20 or the slip 34, thereby permitting him to accurately update the PLU file. In a preferred embodiment, the operator has the alternative of updating the PLU file immediately or he can provide the slip 20 or the slip 34 to the manager who will update the PLU file at the end of the transaction or plurality of transactions, as described previously herein.

While the invention has been described with reference to a specific embodiment and, for example, dedicated formats on slips 20 and 34 have been described, these descriptions are merely illustrative and are not to be construed as limiting the scope of the invention. Various modifications and changes may occur to those skilled in the art without departing from the spirit and scope of the invention as defined by the appended claims.

What is claimed is:

1. A method for updating a PLU file for a not-yet-registered article in a POS terminal which is used in a checkout system, said method comprising the steps of:

inputting bar code data corresponding to the not-yet-registered article into said POS terminal;

accessing the PLU file by the POS terminal and inquiring if article code data is registered in the PLU file;

displaying on the POS terminal information that the article is not registered in the PLU file;

displaying format data of the not-yet-registered article on a display on said POS terminal;

printing under the control of said POS terminal format data corresponding to the not-yet-registered article on a slip having a dedicated format; and using said format data printed on said slip to update said PLU file.

2. The method of claim 1 in which said checkout system includes a processor coupled to said POS terminal, said processor having said PLU file stored therein, said using step further including the step of:

utilizing said slip to update said PLU file in said processor.

3. The method of claim 2 in which said using step further includes the step of:

using said POS terminal to input article information into said processor.

4. The method of claim 1 in which said printing step further includes the step of:

retrieving said data directly from the not-yet-registered article.

5. The method of claim 1 wherein said data of said printing step includes an article code number corresponding to the not-yet-registered article.

6. The method of claim 5 wherein said data of said printing step includes a bar code corresponding to the article code number on said slip.

7. The method of claim 1 wherein said printing step includes the step of:

inserting said dedicated format slip into a printer for printing said data.

8. The method of claim 1 wherein said inputted step is effected by scanning said bar code with a hand-held scanner coupled to the POS terminal.

9. The method of claim 1 wherein said checkout system handles purchased articles one at a time.

10. The method of claim 1 wherein said inputting step includes the step of:

reading a bar code on the not-yet-registered article.

* * * * *

UNITED STATES PATENT AND TRADEMARK OFFICE
CERTIFICATE OF CORRECTION

PATENT NO. : 5,162,639

DATED : November 10, 1992

INVENTOR(S) : Hiromasa Sugiyama

It is certified that error appears in the above-identified patent and that said Letters Patent is hereby corrected as shown below:

Title Page, add -- [56] References Cited, U.S. Patent Documents

| | | | |
|---|---|---|---|
| 4,419,573 | 12/1983 | von Geldern | 235/383 |
| 4,440,248 | 4/1984 | Teraoka | 177/4 |
| 4,529,871 | 7/1985 | Davidson | 235/383 |
| 4,656,344 | 4/1987 | Mergenthaler et al. | 235/462 |
| 4,679,154 | 7/1987 | Blanford | 364/525 -- |

Column 4, line 60, delete "inputted" and substitute --inputting--.

Signed and Sealed this

Twenty-ninth Day of March, 1994

Attest:

BRUCE LEHMAN

*Attesting Officer*

*Commissioner of Patents and Trademarks*